(12) United States Patent
Kato

(10) Patent No.: US 6,357,417 B2
(45) Date of Patent: Mar. 19, 2002

(54) START UP CONTROL FOR ENGINE

(75) Inventor: Masahiko Kato, Hamamatsu (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/241,718

(22) Filed: Feb. 2, 1999

(30) Foreign Application Priority Data

Feb. 4, 1998 (JP) ............................................. 10-023046
Mar. 31, 1998 (JP) ............................................. 10-086275

(51) Int. Cl.⁷ ............................................................ F02D 41/40
(52) U.S. Cl. .......................... 123/305; 123/431; 440/89
(58) Field of Search ................................. 123/305, 431, 123/73 C, 73 CB, 179.17; 440/89

(56) References Cited

U.S. PATENT DOCUMENTS

| 5,476,402 A | * | 12/1995 | Nakai et al. ................... 440/89 |
| 5,775,304 A | * | 7/1998 | Kono et al. ................... 123/494 |
| 5,924,405 A | * | 7/1999 | Hashimoto ................... 123/431 |
| 5,927,247 A | | 7/1999 | Tanaka ......................... 123/305 |
| 5,941,209 A | * | 8/1999 | Hashimoto ................... 123/295 |

* cited by examiner

Primary Examiner—Andrew M. Dolinar
(74) Attorney, Agent, or Firm—Knobbe, Martens, Olson & Bear, LLP

(57) ABSTRACT

A feed back control system and method for direct injected engines useful in a start up operation that utilizes a fuel pressure condition sensor. At the commencement of cranking, the feed back control system adjusts at least the initiation of fuel injection based upon the output from the fuel pressure condition sensor. This removes a great shift in the fuel pressure between before and after starting of the engine and eventually promotes operator's feeling and also improves exhaust emissions.

18 Claims, 13 Drawing Sheets

Cylinder without Sensor

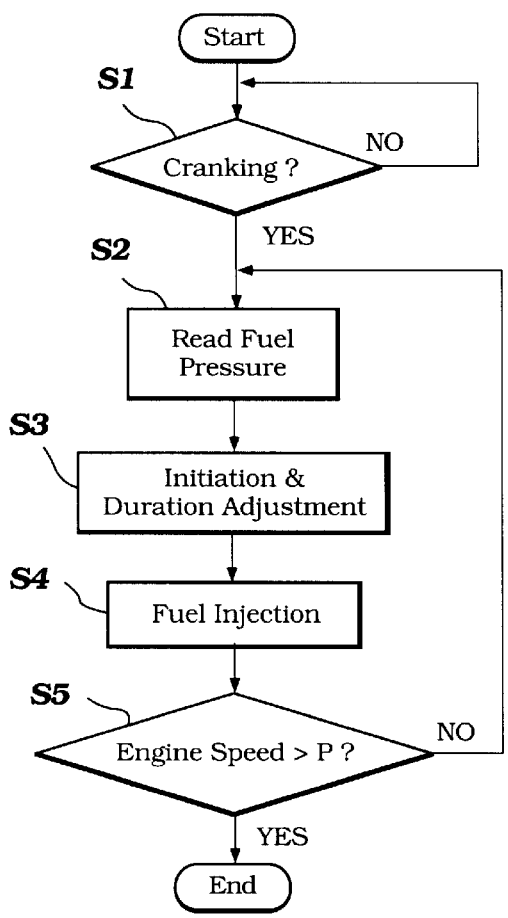
*Figure 10*
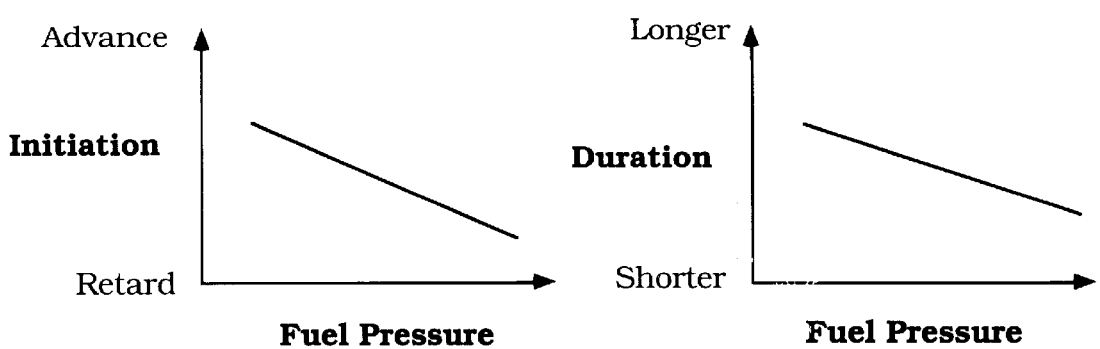
*Figure 11*  *Figure 12*

START UP CONTROL FOR ENGINE

BACKGROUND OF THE INVENTION

This invention relates to a start up control for an engine and more particularly to an improved feedback control system and method for a direct injected internal combustion engine in a start up operation.

In the interest of improving engine performance and particularly fuel efficiency and exhaust emission control, many types of engines now employ fuel injection and/or feedback control of the fuel supply to the engine. Fuel injection has the advantages of permitting the amount of fuel delivered for each cycle of the engine to be adjusted. In addition, by utilizing fuel injection and a feedback control system, it is possible to maintain the desired fuel air ratio under a wide variety of engine running condition.

These features are particularly useful with two cycle engines, although not specifically limited thereto. Because the overlap between the scavenge port and exhaust port opening and closing gives rise to the possibility that unburned hydrocarbons may pass into the atmosphere through the exhaust port. In addition, amounts of exhaust gases remaining in the combustion chamber relatively under light speeds and loads can cause misfiring and eventually unburned hydrocarbons again pass through the atmosphere.

Generally, the fuel injection is performed under a relatively high pressure. For this purpose, two different pumps are provided. One is an electrically driven pressure pump which creates a relatively low pressure such as 3 kg/cm$^2$, while the other is a high pressure, engine driven, positive displacement pump which increases the pressure delivered by the former pump to extremely high pressure such as 50 kg/cm$^2$. However, immediately after commencement of cranking, the high pressure pump cannot supply the desired pressure because a starter motor, which powers the high pressure pump at this stage, cannot give sufficient cranking speeds. In addition, the generated pressure is likely accompanied with undesirable fluctuations because the viscosity of lubricating oil for the high pressure pump varies corresponding to the atmospheric temperatures, engine temperatures and deterioration of the oil in quality. Some conventional engines, thus, generally have an electromagnetic valve bypassing the high pressure pump so that only the primary pump may give pressure for the fuel injection.

However, the pressure that will be developed by the high pressure pump after the start up of an engine greatly differ from the pressure given only by the primary pump during the start up (see the dot-dash-line in FIG. 14). The difference also causes a great difference between both of the initiation and the duration of the fuel injection during and after the start up. As a result, the engine cannot start very smoothly and this gives the operator an uneasy feeling.

Also, a relatively large size of sprayed particles under the lower pressure condition gives rise to misfiring (see the relationship between the size of the sprayed fuel and the fuel pressure shown in FIG. 16) and hence the start up time cannot be shortened. Further, since the primary pump only allows fuel injectors to spray a small amount of fuel per unit time, a long duration and an early initiation are required. Accordingly, hydrocarbons and other undesirable substances tend to be discharged to the atmosphere.

Further, the high pressure pump cannot supply sufficient fuel at the commencement of cranking. Due to this nature, if the feedback control demands the high pressure pump to increase the amount of fuel, the pressure generated by the pump may have fluctuations and then relatively long time for cranking may be necessary, because the larger the amount of fuel, the faster the fuel pressure deteriorates (see FIG. 17).

Particularly, in two cycle engines, the fuel injection should be initiated during a limited period for preventing injected fuel from passing through the exhaust port and due to the short time of sprayed fuel diffusion in comparison with four cycle engines. Thus, it is a significant matter how to raise the pressure of injected fuel at the commencement of cranking.

The problem is particularly acute in connection with marine applications because the exhaust gases may be discharged to the atmosphere through the body of water in which the watercraft is operating for silencing purposes. The water level can change due to boat motion, changes in both velocity and other factors. In addition, the trim angle and height of the propulsion unit may be altered. This also will change the back pressure. Accordingly, the combustion conditions tend to be inferior and an increase in the fuel pressure at the commencement of cranking is necessary.

It is, therefore, a principal object of this invention to provide an improved engine feedback control system and particularly a start up operation for the system.

It is a further object of this invention to provide an improved engine feedback control system and method for feedback control engines wherein proper injections of fuel are provided at all times even under the unstable fuel pressure conditions in the start up operation. Also the fuel pressure can be raised so that the engine starts smoothly without giving an operator an uneasy feeling and also improve exhaust emissions.

SUMMARY OF THE INVENTION

This invention is adapted to be embodied in a direct cylinder injected, internal combustion engine having an engine body defining at least one cylinder bore in which a piston reciprocates. A cylinder head is affixed to one end of the engine body for closing the cylinder bore and defining with the piston and the cylinder bore a combustion chamber. At least one intake port is provided for admitting an air charge to the combustion chamber. At least one exhaust port is provided for discharging burned combustion products from the combustion chamber. A fuel injector is provided for spraying fuel directly into the combustion chamber for combustion therein. A fuel pump is provided for supplying the fuel to the fuel injector. Means are provided for sensing the pressure of fuel supplied by the fuel pump. A feedback control system adjusts at least initiation of the fuel injection based upon the output from the fuel pressure sensing means.

In accordance with a method of practicing the invention, the pressure of fuel supplied by the fuel pump is sensed. During the time the condition is sensed, at least initiation of the fuel injection is adjusted.

BRIEF DESCRIPTION OF THE DRAWINGS

FIG. 10 is a graphical view showing the control routine utilized to determine when the engine is in the start up mode.

FIG. 11 is a graphical view showing the relationship between the fuel pressure and the initiation of fuel injection.

FIG. 12 is a graphical view showing the relationship between the fuel pressure and the duration of fuel injection.

DETAILED DESCRIPTION OF THE PREFERRED EMBODIMENTS OF THE INVENTION

Figure 1:
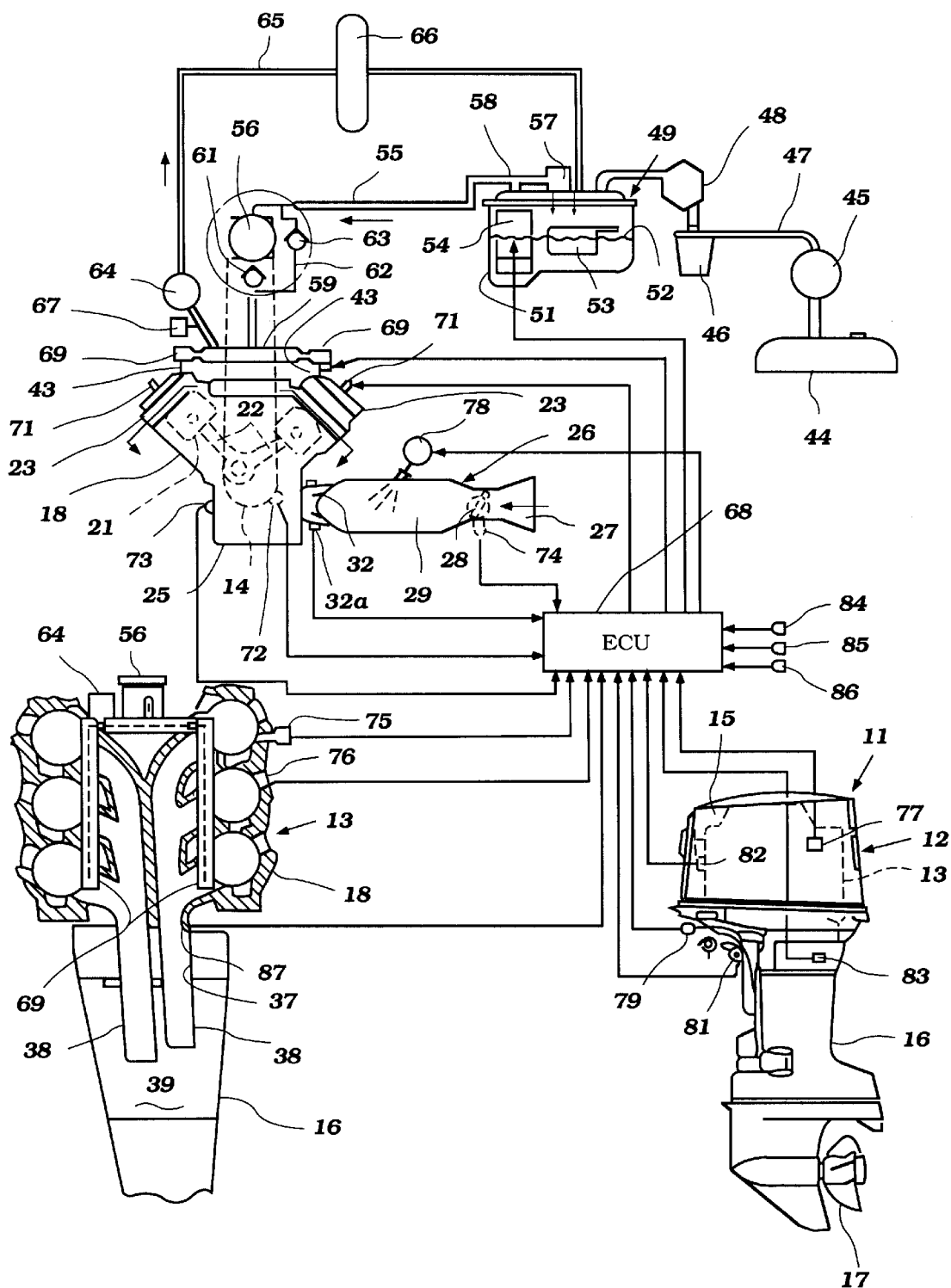
FIG. 1 is a partially schematic view having three portions that are connected by the controlling ECU of the engine. The lower right hand portion of this view shows a side elevational view of an outboard motor, the lower left hand side shows a rear elevational view of the outboard motor on an enlarged scale and a partial cross-section of the engine taken through the cylinders and exhaust manifold and the upper portion shows a top plan view of the engine and the fuel supply system with portions shown schematically.

Referring initially primarily to FIG. 1, the lower right hand portion of this view illustrates a side elevational of an outboard motor that is constructed and operated in accordance with the invention. The outboard motor is indicated generally by the reference numeral 11 and except as will hereinafter be noted maybe considered to be of a generally conventional construction.

Figure 14:
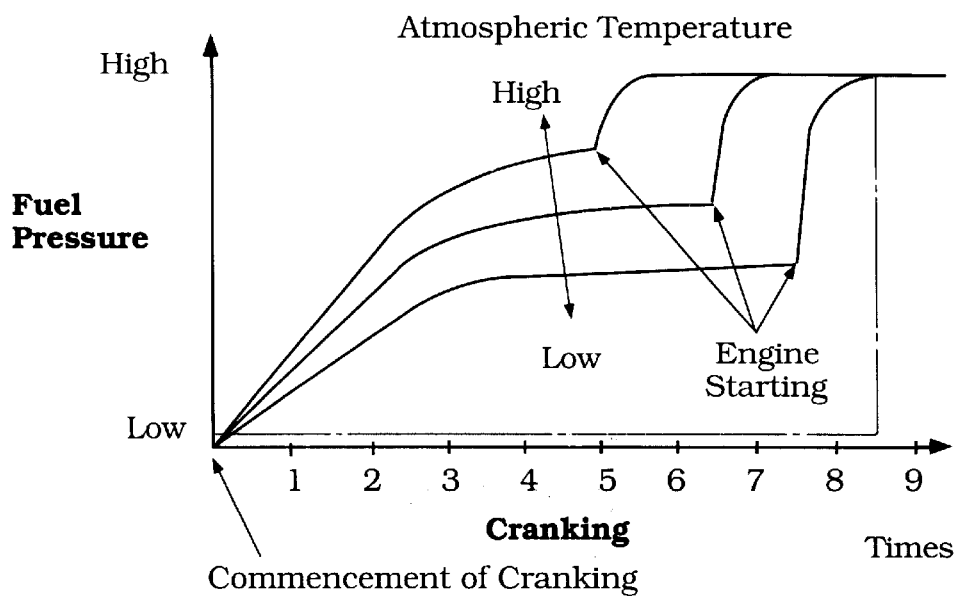
FIG. 14 is a graphical view showing the relationship between the number of times of cranking and the fuel pressure in relation to the atmospheric temperature.

The outboard motor 11 comprises a power head 12 that contains a powering internal combustion engine 13. As best seen in the other two portions of this figure, the engine 13 is, in this embodiment, of the V6 type and operates on a two stroke crankcase compression principal. Although the number of cylinders and cylinder orientation can be varied, the invention has particularly utility in connection with two cycle engines and particularly those having multiple cylinders but certain of the control strategy also is applicable to four cycle engines. Such an embodiment is shown in FIG. 14.

As is typical with outboard motor practice, the engine 13 is supported in the power head 12 so that its crankshaft 14 rotates about a vertically extending axis for a reason which will be described momentarily.

The power head 12 is completed by a protective cowling 15 which surrounds and protects the engine 13. This protective cowling 15 is formed with an air inlet opening so that induction air for operation for the engine 13 can be drawn from the surrounding atmosphere.

The engine 13 and specifically its crankshaft 14 are coupled to a driveshaft (not shown) that depends into and is journaled within a driveshaft housing lower unit assembly 16. This is the reason for the vertical orientation of the axis of rotation of the crankshaft 14. This driveshaft depends into the lower unit where it drives a propulsion device for an associated watercraft through a suitable transmission. In the illustrated embodiment, the propulsion device comprises a propeller 17 which is selectively driven in forward and reversed directions through a bevel gear reversing transmission of the type well known in this art.

The outboard motor 11 also includes clamping and swivel brackets or another arrangement for mounting it to the transom of an associated watercraft. Since these types of constructions are well known in the art, further description of them is not believed to be necessary to permit those skilled in the art to practice the invention. The mounting arrangement is such, however, that the height and trim angle of the propeller 17 may be adjusted, even during running. This is significant in the engine control, as will become apparent.

Figure 2:
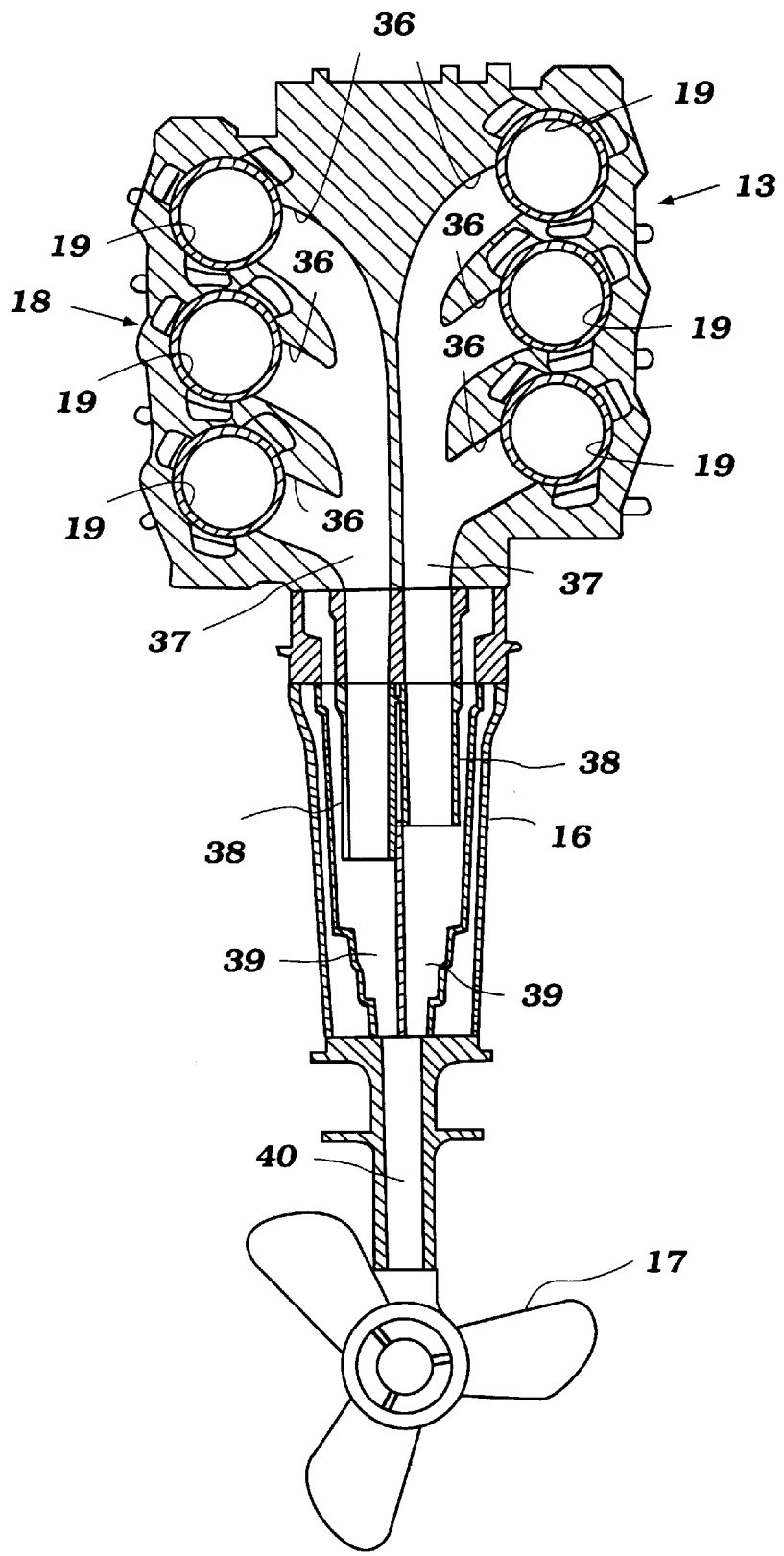
FIG. 2 is an enlarged and more complete view of the outboard motor as shown in the lower left hand view of FIG. 1.

Referring now primarily to the lower left hand view and the upper view of FIG. 1 and additionally to FIG. 2, the engine 13 includes a cylinder block, indicated generally by the reference numeral 18. Because of the V-type configuration employed in this embodiment, the cylinder block 18 is formed with two cylinder banks each of which has three vertically spaced cylinder bores 19. Pistons 21 are slidably supported in the cylinder bores 19. The pistons 21 are connected by means of connecting rods 22 to the throws of the crankshaft 14 for driving it in a known manner.

Cylinder head assemblies, indicated generally by the reference numeral 23 are affixed to the banks of the cylinder block 18 and close the cylinder bores 19. These cylinder head assemblies 22, the cylinder bores 19 and the pistons 21 form the combustion chambers of the engine 13.

The crankshaft 14 rotates in a crankcase chamber defined by the cylinder block 18 and a crankcase member 24 that is affixed thereto. As is typical with two cycle crankcase compression engines, the portions of the crankcase chamber, indicated schematically at 25, associated with each of the cylinder bores 19 are sealed from each other.

An air charge is delivered to these individual crankcase chamber sections 25 by an air induction system which appears also in the upper portion of FIG. 1 and which is indicated generally by the reference numeral 26. This induction system 26 includes an air inlet device 27 that may include a silencing arrangement and which draws air from within the protective cowling 15 that has been admitted through the aforenoted inlet opening.

A throttle valve 28 is provided in throttle bodies that communicate with the intake device 27 and deliver it to intake manifold runners 29 of an intake manifold assembly. The throttle valves 28 are controlled in any suitable manner to satisfy the operator demand. The intake manifold runners 29 communicate with intake ports 31 formed in the crankcase member 24 and each associated with a respective cylinder bore 19.

Reed type check valves 32 are provided in the manifold runners 29 adjacent the intake ports 31. These reed type check valves permit an air charge to be drawn into the crankcase chambers when the respective pistons 21 are moving upwardly in their cylinder bores 19. As the pistons 21 move downwardly, the charge in the crankcase chambers 25 will be compressed and the respective reed type check valve 32 will close to preclude reverse flow. An intake air temperature sensor 32a is also provided in the manifold runners 29 adjacent the intake ports 31.

Figure 3:
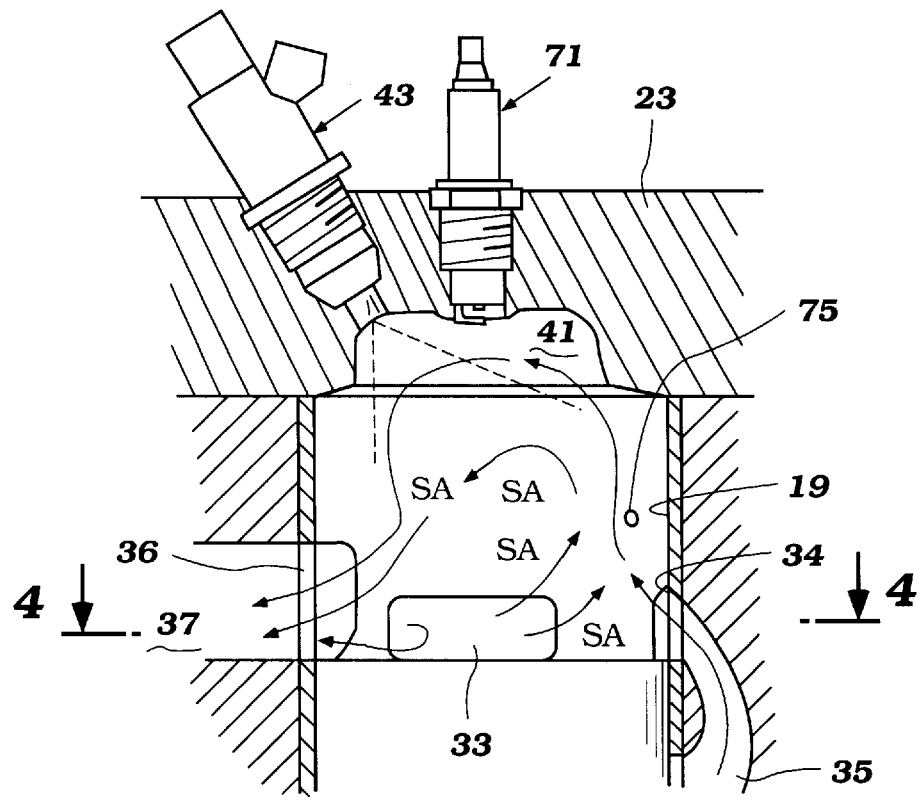
FIG. 3 is an enlarged cross-sectional view taken through a single cylinder of the engine and depicts part of the theory by which the control strategy operates.
Figure 4:
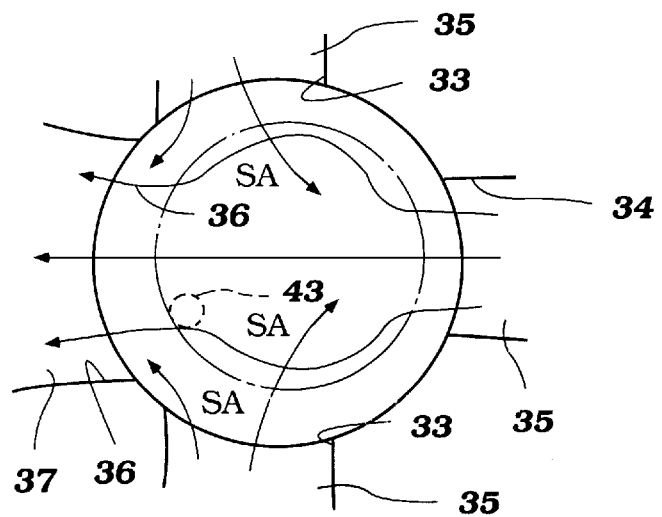
FIG. 4 is a cross-sectional view taken along the line 4—4 in FIG. 3 to further show the scavenging air flow pattern and the path of injected fuel.

Referring now additionally to FIGS. 3 and 4, it will be seen that each cylinder bore is provided with a scavenging system. In the illustrated embodiment, the scavenging system is of the Schnurl type and includes a pair of side, main scavenge ports 33 and a center, auxiliary scavenge port 34. Scavenge passages 35 communicate the crankcase chambers 25 with each of the scavenge ports 34. As is well known in two cycle practice, the scavenge ports 33 and 34 are opened and closed by the reciprocation of the pistons 21 in the cylinder bores 19.

It should be noted that the main scavenge ports 33 are disposed on opposite sides of an exhaust port 36 which is diametrically opposite the auxiliary scavenge port 34. As may be best seen in the lower left hand portion of FIG. 1 and in FIG. 2, the exhaust ports 36 communicate with exhaust manifolds 37 that are formed integrally within the cylinder block 18. Basically, there is an exhaust manifold 37 for each bank of cylinders.

These exhaust manifolds 37 terminate in exhaust pipes 38 that depend into a pair of expansion chambers 39 formed in the driveshaft housing and lower unit 16. These expansion chambers 39 communicate with a suitable high speed underwater exhaust gas discharge and a low speed, above the water exhaust gas discharge of any known type.

The underwater exhaust gas discharge is shown primarily in FIG. 2 and includes a conduit 40 that depends through the lower unit portion of the drive shaft housing lower unit and which communicates through the hub underwater discharge formed in the propeller 17.

As has been previously noted, the trim and height of the propeller 17 can be adjusted and this adjustment will change the depth of submersion of the underwater discharge during engine running. In addition, various water conditions may also cause this height to vary during engine running. In addition, various water conditions may also cause this height to vary during engine running. Thus, the back pressure on the exhaust system will be variable and this back pressure is particularly significant in effecting the rate of air flow in scavenging the combustion chambers of the engine. Thus, a condition is present with marine applications that is not existent normally in automotive applications and which can seriously effect the feedback control, as will be described shortly.

As the pistons 21 move downwardly in their cylinder bores 19 toward the bottom dead center position shown in FIG. 4, the charge compressed in the crankcase chambers 25 will be compressed and eventually transfer to the respective engine combustion chamber, indicated generally by the reference numeral 41 through the scavenge passages 35 and scavenge ports 33 and 34 when they are opened by the movement of the piston 21. The flow of scavenging air is shown in FIGS. 2 and 3 by the arrows SA.

In accordance with an important feature of the invention, the engine 13 is provided with a direct cylinder fuel injection system. This fuel injection system is shown in part schematically in the upper portion of FIG. 1 and will now be described by particular reference to that figure. Before referring thereto, however, it should be noted that fuel injectors 43 are mounted in the cylinder head assembly 23 so as to spray fuel from this fuel supply system directly into the combustion chambers 41. The location and functioning of these fuel injectors 43 will be described after the system which supplies fuel to them has been described.

As is typical with outboard motor practice, the outboard motor 11 is supplied with fuel from a main fuel tank 44 which is normally mounted within the hull of the associated watercraft. Fuel is supplied form this tank 44 by a first low pressure pump 45 to a fuel filter 46 that is mounted within the protective cowling 12. The connection from the fuel tank 44 to the filter 46 includes a conduit 47 having a quick disconnect coupling of a known type.

A second, engine driven low pressure fuel pump 48 in the power head 12 collects the fuel from the fuel filter 46 and delivers it to a vapor separator, indicated generally by the reference numeral 49. The low pressure fuel pumps 48 may be of the type that are operated by crankcase pressure variations as is well known in this art.

The vapor separator 49 includes an outer housing 51 that is mounted at a suitable location within the protective cowling 15. A level of fuel, indicated at 52 is maintained in this housing 51 by a valve operated by a float 53.

Contained within the housing 51 is an electrically driven pressure pump 54 which develops a higher pressure than the pump 48 but a pressure that is not really high enough for effective high pressure direct cylinder injection.

This fuel is discharged from the vapor separator housing 51 through a supply conduit 55 to a high pressure, engine driven, positive displacement pump 56. The pump 56 may be of any known type and preferably has one or more plungers operated by cams for delivering extremely high pressures at a positive displacement. The pressure at which fuel is delivered to the high pressure pump 56 is regulated by a low pressure regulator 57 in a return line 58 that communicates the pressure line 55 back with the interior of the vapor separator body 51.

The high pressure pump 56 delivers fuel under pressure to a main fuel manifold 59 through a conduit in which a check valve 61 is positioned. A parallel conduit 62 extends around the high pressure pump 56 to the main fuel manifold. A check valve 63 is provided in this bypass line so that when the high pressure pump 56 is generating high pressure fluid, no flow will occur through the line 62.

A high pressure regulator 64 is provided in a return line 65 and limits the maximum pressure of the fuel supply to the fuel injectors 43. This is done by dumping fuel back to the vapor separator assembly 49 through the return line 65. A fuel heat exchanger or cooler 66 may be provided in this return line 65 so as to ensure that the fuel is not at too high a temperature.

A pressure sensing device 67 is provided also in the return line 65 for providing a fuel pressure signal to an ECU, indicated at 68 in FIG. 1 for controlling the engine systems, as will be described.

The main fuel manifold 59 supplies fuel to a pair of fuel rails 69 each of which is associated with a respective one of the cylinder banks. The fuel rails 69 each supply fuel in a known manner to the fuel injectors 43 of the respective cylinder banks.

As seen in FIGS. 3 and 4, the fuel injectors 43 are mounted in the cylinder head assemblies 23, in the illustrated embodiment, over the exhaust ports 36 on the exhaust side of the engine. These injectors spray downwardly toward the heads of the pistons 21. The fuel injectors 43 are preferably of the solenoid operated type and have a solenoid valve which, when opened, controls the discharge of fuel into the combustion chambers as shown in broken lines in FIG. 3 so as to provide a fuel patch in the combustion chamber, the size of which depends upon the duration of fuel injection as will become apparent.

Spark plugs 71 are mounted in the cylinder head assemblies 23 and have their spark gaps disposed substantially on the axis of the cylinder bores 19. These spark plugs 71 are fired by an ignition circuit under the control of the ECU 68.

The ECU 68 controls the timing of firing of the spark plugs 71 and the beginning and duration of fuel injection by the injector 69. To this end, there is provided a number of sensors which sense either engine running conditions, ambient conditions or conditions of the outboard motor 11 that will effect engine performance. Certain of the sensors are shown schematically in FIG. 1 and will be described by reference to that figure. It should be readily apparent to those skilled in the art, however, that other types of sensing and control arrangements may be provided operating within the general parameters which will be set forth later having to do with the timing of initiation of fuel injection.

A crank angle sensor 72 is associated with the crankshaft 14. This sensor 72 provides not only a signal of crank angle but by comparing that signal with time an indication of crankshaft rotational speed.

There is also provided a crankcase pressure sensor 73 which senses the pressure in one or all of the crankcase chambers 25. By measuring crankcase pressure at a particular crank angle, engine air induction amount can be determined.

Engine or operator demand is determined by a throttle position sensor 74 that operates in conjunction with a throttle valve 28 so as to determine this function.

The ECU 68 operates primarily on a feedback control condition and thus, an air fuel ratio sensor 75 is provided that communicates with the combustion chambers or exhaust port of at least one of the cylinder. Preferably, an oxygen ($O_2$) sensor is utilized for this purpose, although other types of devices may be employed.

In order to provide a good indication of the fuel/air ratio, it is important that the oxygen sensor 75 is positioned so that it will sense the combustion products near the completion of combustion and before a fresh charge of air is delivered to the combustion chamber. Therefore, and as best shown in FIG. 3, the oxygen sensor 75 is provided so that its probe opens into the cylinder bore 19 at a point that is disposed slightly vertically above the upper edge of the exhaust port 36. In this way, the oxygen sensor 75 will be in a position to receive combustion products immediately before opening of the exhaust port and most positively before the opening of the scavenge ports so that it will sense the combustion products at the time combustion has been substantially completed.

Engine temperature is sensed by an engine temperature sensor 76. The temperature 25 of the cooling water drawn from the body of water in which the watercraft or outboard motor 11 is operated is measured by a water temperature sensor 77. As has been noted, those sensors described may be just typical of any of the wide variety of sensors utilized for engine control.

In addition to controlling timing of firing of the spark plugs 71 and initiation and duration of fuel injection by the fuel injectors 43, the ECU 68 may also control a lubricating system. This is comprised of an oil supply system including a pump 78 that sprays oil into the intake passages 29 for engine lubrication. In addition, some forms of direct lubrication may be also employed for delivering lubricant directly to certain components of the engine.

It has already been noted that the adjustment of the angle of the propeller 17 will change the vertical position of its high-speed exhaust discharge and accordingly the back pressure. Thus, there are provided additional sensors which sense factors that will indicate this depth. These comprise an engine height sensor 79 that is mounted on the outboard motor 11 and which senses its height adjustment. Also, a trim angle sensor 81 is provided which senses the adjusted trim angle.

Other sensors may also be employed for control and some of these are associated with the engine 13 or the outboard motor 11 itself. These may include an engine vibration or knock sensor 82 and a neutral sensor 83. The neutral sensor 83 cooperates with the aforenoted forward, neutral, reverse transmission and will provide an indication of when the watercraft is operating in neutral.

Also shown schematically in FIG. 1 is an ignition switch 84, a watercraft pitch sensor 85 that will sense the condition of the watercraft relative to the body of water and an atmospheric temperature sensor 86. Finally, there is provided a back pressure sensor 87 in the exhaust system. Of course, the sensors described are only typical of those types of sensors which may be employed for the feedback control system, as will become apparent.

The components of the system as thus far described may be considered to be conventional and for that reason, where any component has not been illustrated or described in detail, reference may be had to conventional or known structures with which to practice the invention.

Figure 5:
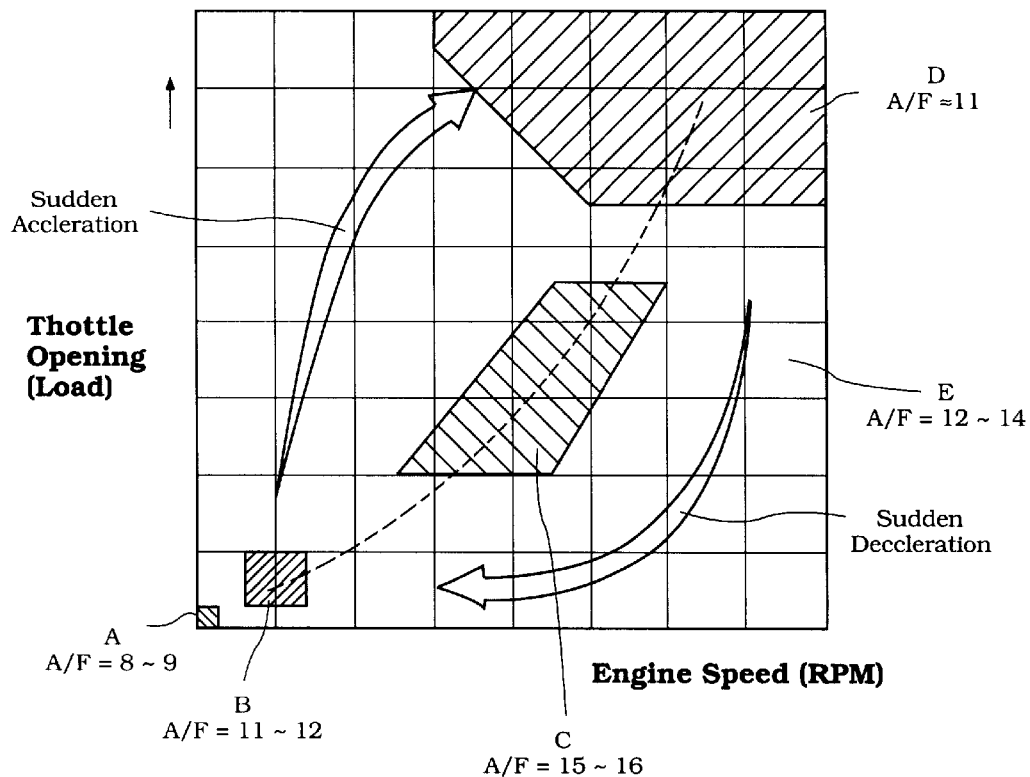
FIG. 5 is a map that shows the different control ranges that are employed in conjunction with the invention.

The basic control strategy for running under other than start up or warm up may be of any known type. For example only this may be to set various desired air fuel ratios depending on the engine running ranges. Examples of various operating ranges are shown in FIG. 5 and will now be described. FIG. 5 is a graphical view showing the determinations that are made in the ECU 68 to determine the engine operational range.

At the commencement of cranking, i.e., in a start up operation, the mixture is kept extremely rich. The air/fuel ratio, hence, is set in the range of about 8 to 9 to 1 as indicated by the reference character A.

Under light loads and speeds the mixture is kept rich and the air/fuel ratio is set so as to be in the range of about 11 to 12 to 1. The reference character B indicates this range.

In midrange conditions there is a control range indicated at C where the engine is operated in a lean burn condition and the mixture may be somewhat stratified. This range is indicated by the reference character C and in this range the air/fuel ratio is maintained in the range of about 15 to 16 to 1.

Under high load/high speed conditions which approaches wide open throttle, there is a third control range indicated at D where the mixture is run on the excessively rich side to protect the engine from damage. In this range, the air to fuel ratio is maintained about 11 to 1.

There is a remaining range outside of those noted which is indicated at E and in this range the mixture is kept on the weak side of rich, i.e., around 12 to 14 to 1.

There are also two other types of conditions which are indicated by the open arrows one of which represents sudden acceleration and the other of which indicates sudden deceleration. As aforenoted, these are typical of the normal feed back control ranges with which the invention may be employed.

As has been noted, this invention deals primarily with the mode of control during engine starting or engine warm up. These condition are sensed in a manner which will be described later.

Figure 6:
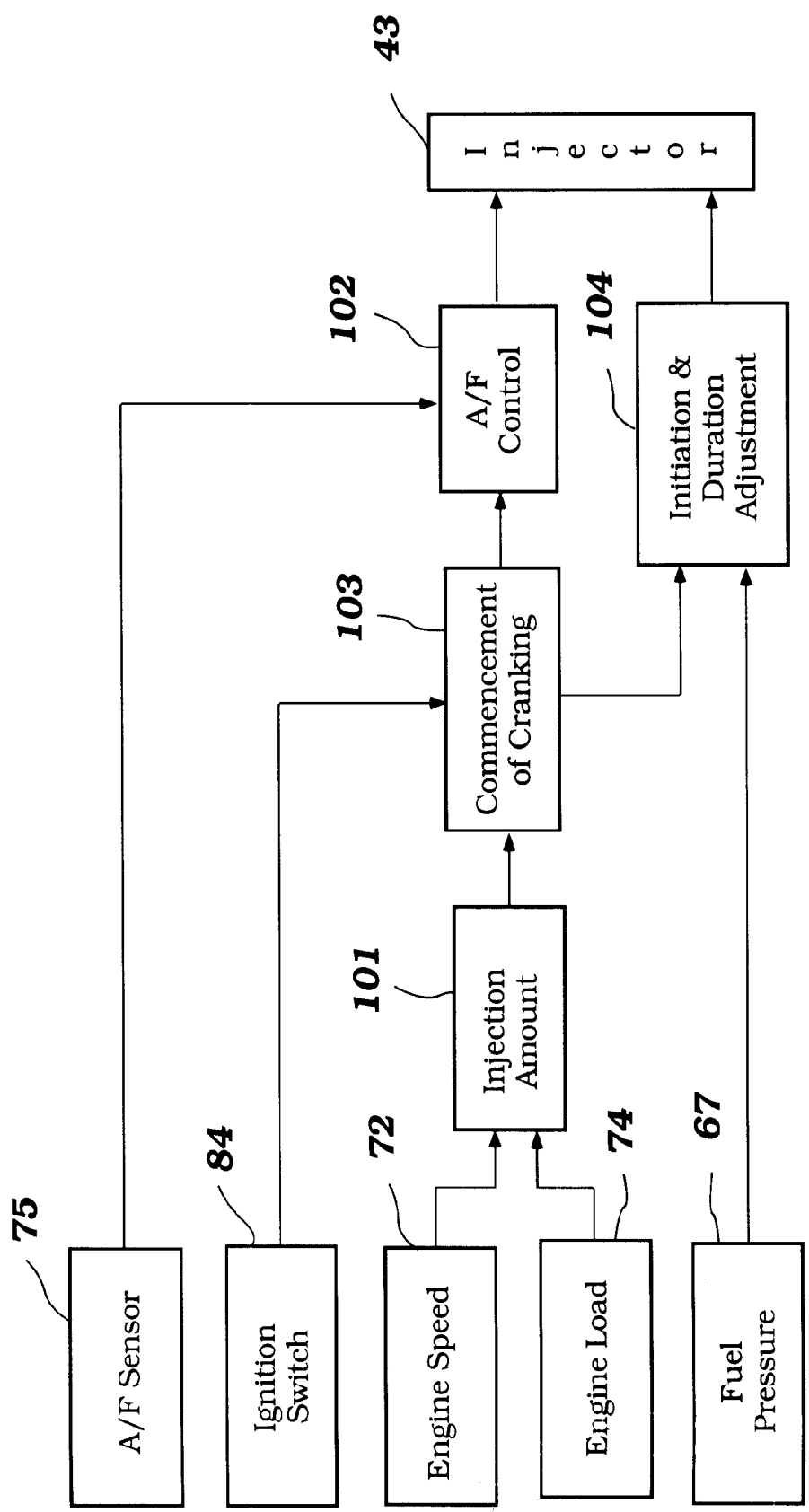
FIG. 6 is a block diagram showing the components associated with the start up control for the fuel injectors of the engine.
Figure 9A:
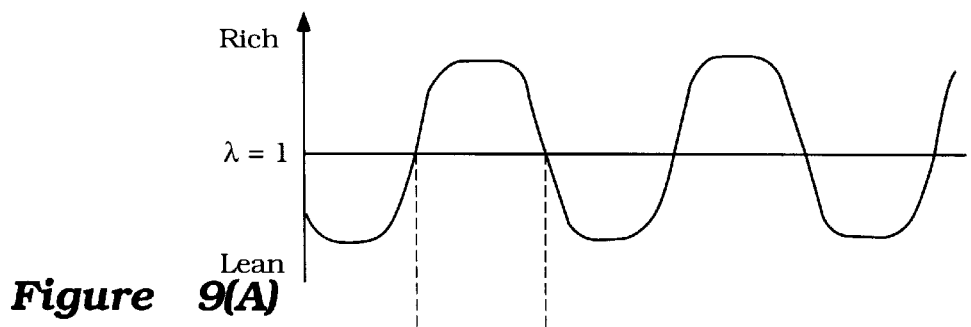
FIG. 9 is a graphical view showing, from top (A) to bottom (D), the sensor output, the fuel injected amount for the cylinder having the feedback control during start up, the amount of fuel supplied to those cylinders not operated under feedback control and the overall engine mixture strength.
Figure 9B:
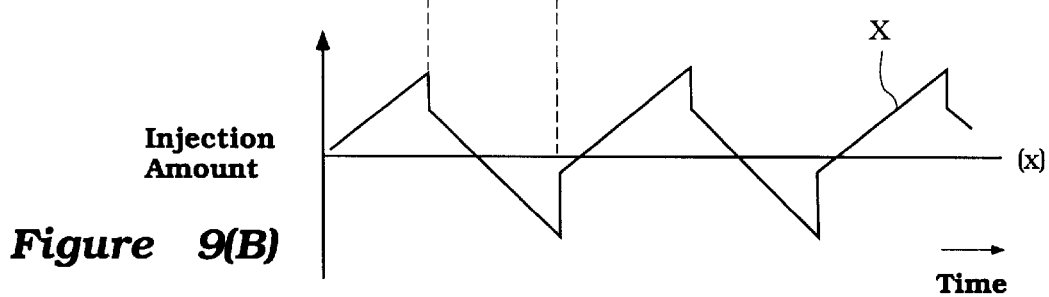
Figure 9C:
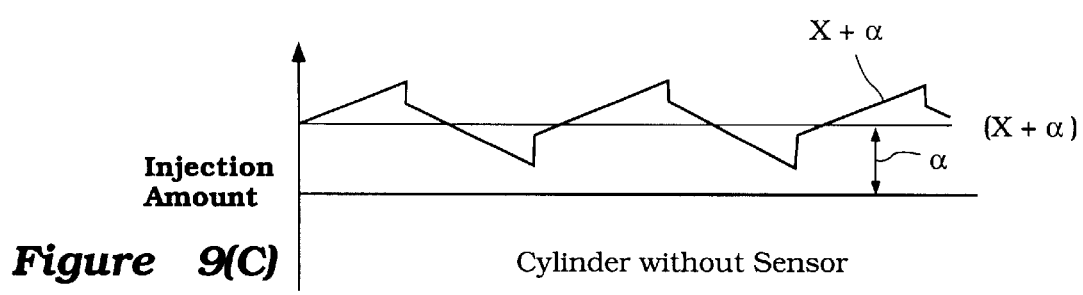
Figure 9D:
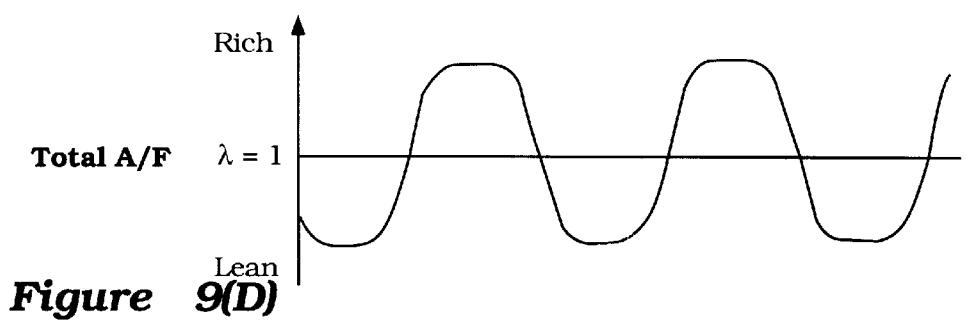

Thus, the system appears generally like that shown in FIG. 6 wherein the output from engine speed sensor, i.e., the crank angle sensor 72 and the engine load, as determined by the throttle position sensor 74, are output to a first control section 101 of the ECU 68 which is the section for feedback control of the cylinder with which the oxygen sensor 75 is associated. This is the number one cylinder on one cylinder bank as clearly seen in FIG. 1.

Figure 7:
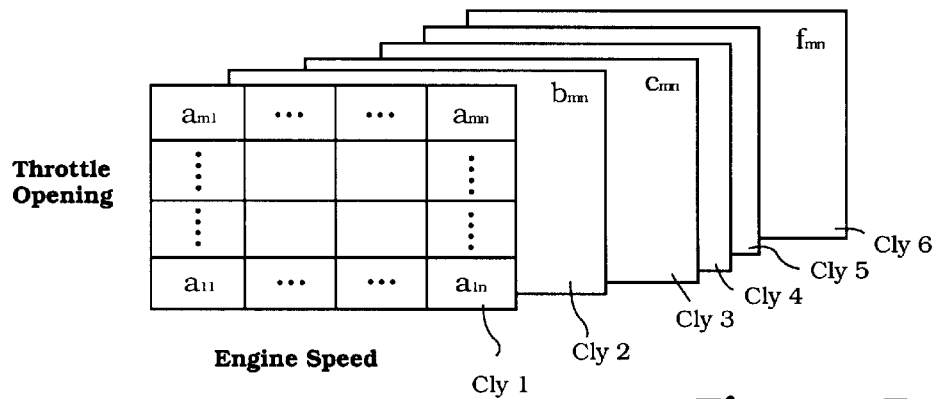
FIG. 7 is a map showing the basic fuel injection amount for each cylinder of the engine.

This control section 101 calculates a fuel injection amount from a basic map as seen in FIG. 7 based upon engine speed and throttle opening. Then, the output from oxygen sensor 75 is transmitted along with this signal to a further control block 102 which makes the feedback control adjustment depending on the sensed deviation from the desired ratio and then supplies injection amount signals to the fuel injector 43 associated with this cylinder.

Another control block 103 of the ECU 68 is provided between the block 101 and the block 103. The control block 103 receives a signal from the ignition switch 67 that indicates the switch 67 is turned on so as to determine if cranking is commenced, that is, an engine is in a start up condition or not. A starter motor (not shown) does the cranking operation. The output from the control block 103 is transmitted to a further control block 104 which makes at least an adjustment of initiation, i.e., beginning of fuel injection and desirably also an adjustment of duration thereof by determining whether the pressure of fuel supplied to the fuel injector 43 by the high pressure pump 56 is under a predetermined value or not. In order to determine the condition of the fuel pressure, preferably the fuel pressure signal provided by the pressure sensing device 67 is used. However, it should be noted that another signal such as an output from the engine speed sensor 72 is also available. Because the fuel pressure rises in proportion to the increase of the engine speed. That is, signals that essentially define, directly or indirectly, a condition of the pressure of fuel supplied by the high pressure pump 56 are useful for the purpose.

Figure 8:
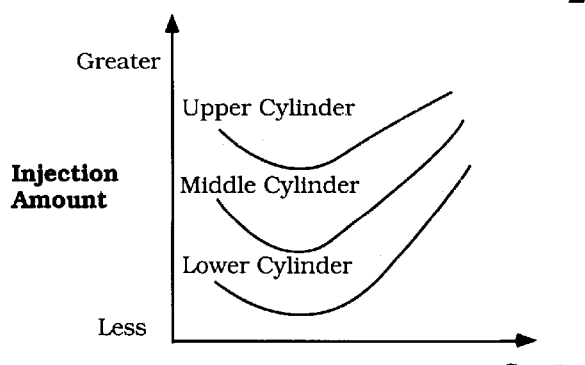
FIG. 8 is a graphical view showing the amount of fuel injected by each vertically disposed cylinder depending upon the engine speed.

As seen in FIG. 8, the higher the cylinder in the engine, the greater the fuel that is supplied to it. This is because of the difference in length from the exhaust port of the cylinder to the end of the exhaust pipe which, with two cycle engines, has a pronounced effect on the air/fuel ratio required for each cylinder to operate efficiently.

Referring to FIG. 9, the air/fuel ratio control will be explained. The graphical views (A), (B), (C) and (D) shows output from the air/fuel ratio sensor, i.e., the oxygen sensor 75, changes of injection amounts for a cylinder with the sensor 75, the same for a cylinder without the sensor 75 and the total air/fuel ratio, i.e., overall engine mixture strength, respectively. With the changes of the output from the sensor 75 from the lean side to the rich side, the injection amount X is reduced by the feedback control device ECU 68, and vice versa. This control brings the theoretical air/fuel ratio (air ratio $\lambda=1$) to the mixtures supplied to the cylinder with the sensor 75. The reference (X) indicates the mean value of the injection amount X. Similarly, the reference $(X+\alpha)$ indicates the mean value of the injection amounts $X+\alpha$ for the cylinders without the sensor 75.

FIG. 10 is a view that shows the control routine that is utilized in conjunction with the invention. The program starts and then moves to step SI so as to perform the fiction by the unit or block 103 of FIG. 6 to determine if the cranking is commenced, that is, if there is a signal from the ignition switch 84. If it is affirmative, then the program moves to the step S2 and read the fuel pressure given by the pressure sensing device 67. Next, the program goes to the step S3 in which at least an adjustment of the initiation and desirably also an adjustment of the duration of the fuel injection is determined based upon the fuel pressure. Then the fuel injection is done at the step S4. After that, the program always checks if the engine speed given by the crank angle sensor 72 excesses the predetermined value P. If this is negative, then the program returns to the step 2. If, on the other hand, this is affirmative, the program ends. It should be noted, it is practicable to read the engine speed instead of the fuel pressure or both at the step S2, while it is also available to check the fuel pressure instead of the engine speed or both at the step S5.

FIG. 11 shows the relationship between the fuel pressure and the initiation of fuel injection (injection timing) and also FIG. 12 shows the relationship between the fuel pressure and the duration of fuel injection. As described above, at least the initiation is adjusted at the step S3. That is, at first, the initiation is advanced and then the duration is elongated if the fuel pressure is relatively small. The smaller the fuel pressure, the longer the duration.

Figure 13:
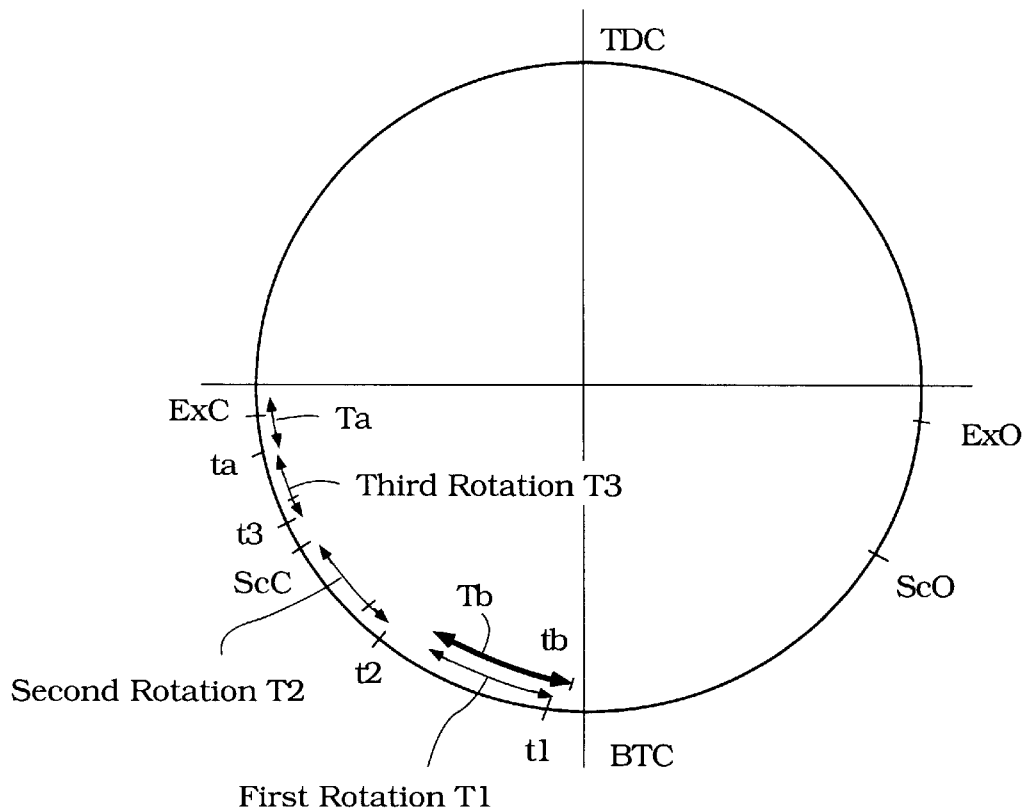
FIG. 13 is a graphical view showing the control method in accordance with the invention by using a diagram of the port timing.

Referring now FIG. 13, the feedback control will be described more in detail. TDC, ExO, ScO, BDC, ScC and ExC are the top dead center, exhaust port opening position, scavenge port opening position, the bottom dead center, scavenge port closing position and exhaust port closing position, respectively.

For more easily understanding of this invention, a control that is done in a conventional engine will be again explained. In normal running conditions, the initiation of fuel injection is made immediately before the opening of the exhaust port that is indicated with the reference "ta". The duration of fuel injection in this state is indicated with the reference "Ta". In the running conditions, the fuel pressure supplied by the high pressure pump is surely quite high. However, at the commencement of cranking, the injection timing of a conventional engine is considerably advanced to "tb" from "ta" and the duration "Tb" is more elongated than the duration "Ta" because the fuel pressure given only by the primary pump is quite small. Accordingly, the difference between both of the fuel pressures is significantly large. This situation is indicated by the dot-dash-line in FIG. 13. Thus, the conventional engine cannot start smoothly and gives an operator an uneasy feeling. Other problems are already described above.

In this invention, thus, the high pressure pump is used even for the cranking purpose in place of the primary pump. Although the first initiation of fuel injection is advanced to "t1" if the fuel pressure is under a predetermined value, the second initiation is retarded to "t2" and the following initiations are gradually retarded at every cranking, i.e., every reciprocation of the piston so that the injection timing comes close to the injection timing in the normal running conditions. This cranking operation continues until the engine starts, that is, the fuel pressure excesses the predetermined value. Along with such a retarding control for the initiation, the duration is also controlled so as to be shortened to keep the proper air/fuel ratio, as seen in FIG. 13. Thus, even under the situation in which the fuel pressure is unstable at the commencement of cranking, an appropriate amount of injection corresponding to every fuel pressure can be made. Also, the fuel pressure at the commencement of cranking will be as high as it permitted to be. This brings an easy feeling to an operator and improves exhaust emissions in the start up operation.

Figure 15:
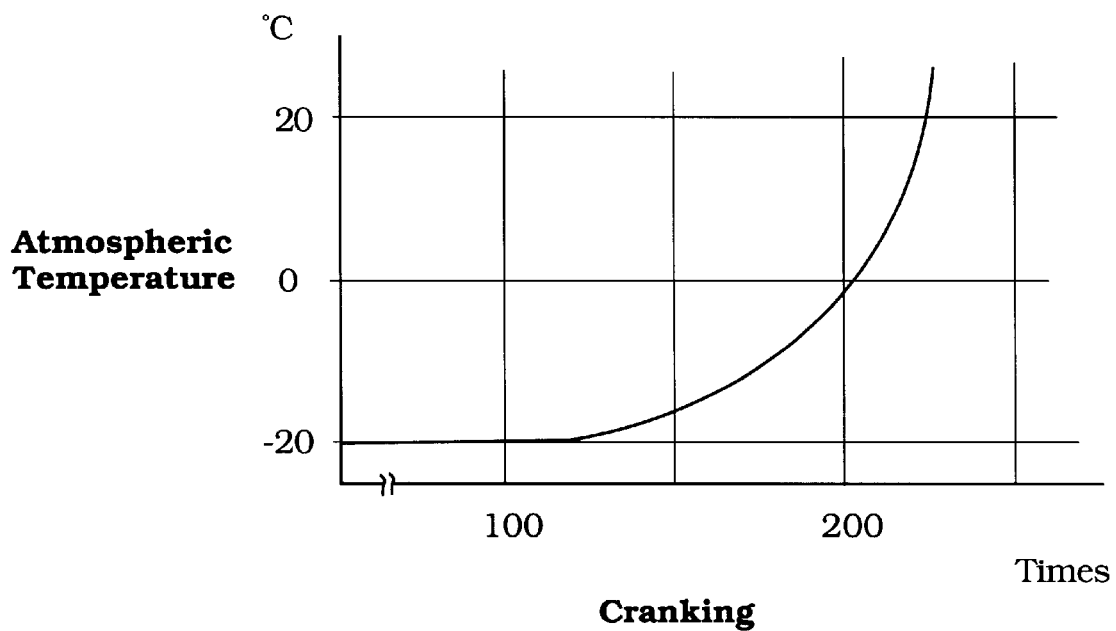
FIG. 15 is a graphical view showing the relationship between the number of times of cranking and the atmospheric temperature.
Figure 16:
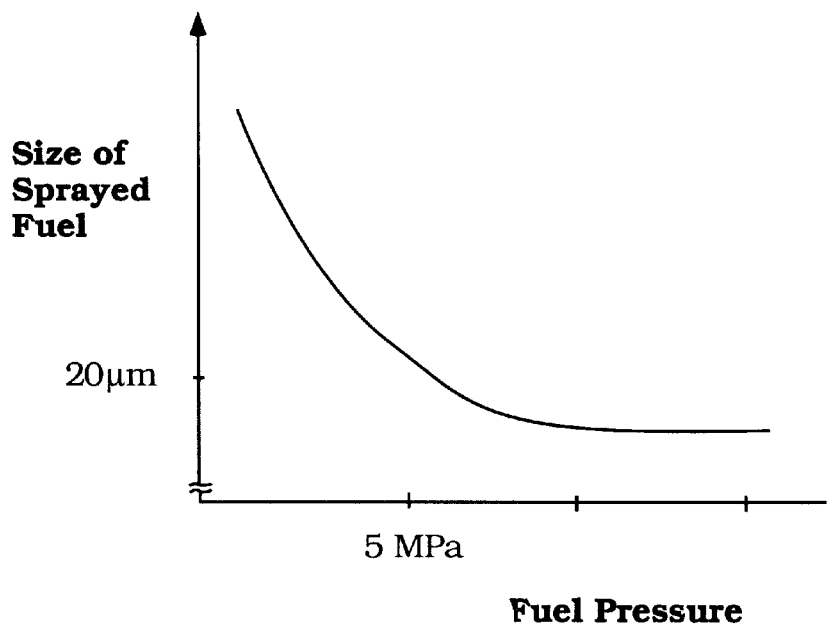
FIG. 16 is a graphical view showing the relationship between the fuel pressure and the size of the particles of sprayed fuel.
Figure 17:
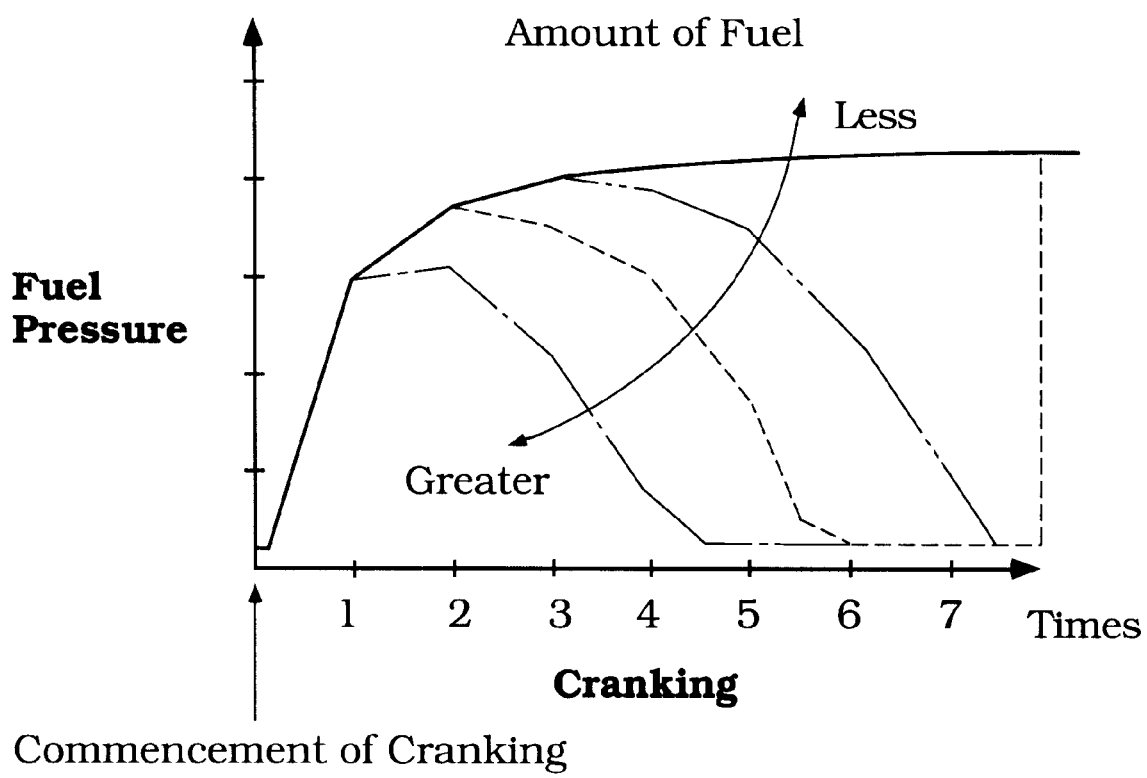
FIG. 17 is a graphical view showing another relationship between the number of times of cranking and the fuel pressure in relation to the amount of fuel.

FIGS. 14, 15 and 16 help to give a more sufficient understanding about the situation described above. As indicated by the rising curves of the solid lines in FIG. 14, the longer the cranking times, the higher the fuel pressure. Such rising curves do not cause the sudden change that happens in the conventional control. This situation is more improved with a rise of atmospheric temperature. Because the viscosity of oil for a starter motor falls with the rise of atmospheric temperature and then, as seen in FIG. 15, the speed of rotation of the crankshaft increases. In addition, as shown in FIG. 16, the higher the fuel pressure, the smaller the size of particles of sprayed fuel. This may again improve the combustion conditions. Also, as indicated in FIG. 17, the appropriate amount of injection does not bring early drop of the fuel pressure. This can also contribute to the improvement of the start up operation.

In marine engines like the outboard motor having multiple cylinders vertically, the lower the cylinder in the engine, the smaller the amount of intake air that is supplied to it This is because of the difference in back pressures affected to each cylinder. Thus, in this embodiment, the lower the cylinder, the smaller the adjustment amount of fuel injection.

As is well known, an amount of fuel injection can be adjusted by changing initiation time and/or duration of the fuel injection. The feedback control system, i.e., the ECU 68, therefore, retards the initiation time and/or shortens the duration of a lower cylinder that has a shorter exhaust passage than an upper cylinder to reduce the adjustment amount. This control is also shown in FIG. 13. Should the initiation timings "t1," "t2," "t3" and "ta" and the duration "T1," "T2," "T3" and "Ta" belong to an upper cylinder, the initiation timings "k1," "k2," "k3" and "ka" and the duration "K1," "K2," "K3" and "Ka"belong to a cylinder. In the illustrated embodiment, the initiation timings "k1," "k2," "k3" and "ka" the lower cylinder are retarded than the initiation timings "t1," "t2," "t3" and "ta" of the upper cylinder. Also, the duration "K1," "K2," "K3" and "Ka" of the lower cylinder" are shortened than the duration "K1," "K2," "K3" and "Ka" of the upper cylinder.

Figure 18:
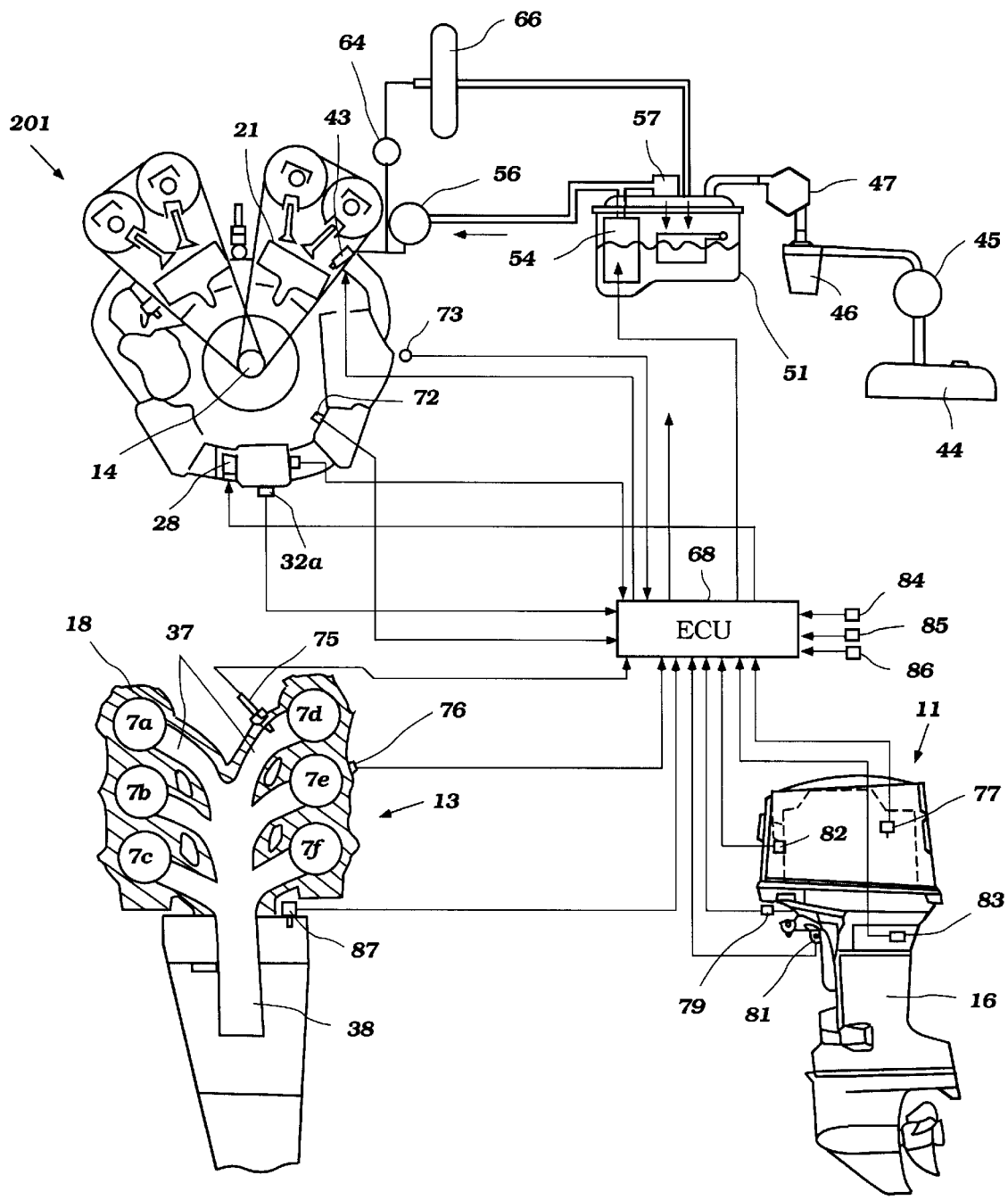
FIG. 18 is a view, in part similar to FIG. 1, and shows a four-cycle engine constructed in accordance with an embodiment of the invention.

The embodiment thus far described was in connection with a two cycle engine. As mentioned earlier, however, the invention also can be utilized with four cycle engines and such engine embodiment is shown in FIG. 18. The illustrated embodiment is of a V6 twin overhead cam shaft engine. The overhead cam shaft mechanism appears in this figure and is identified generally by the reference numeral 201.

Figure 19:
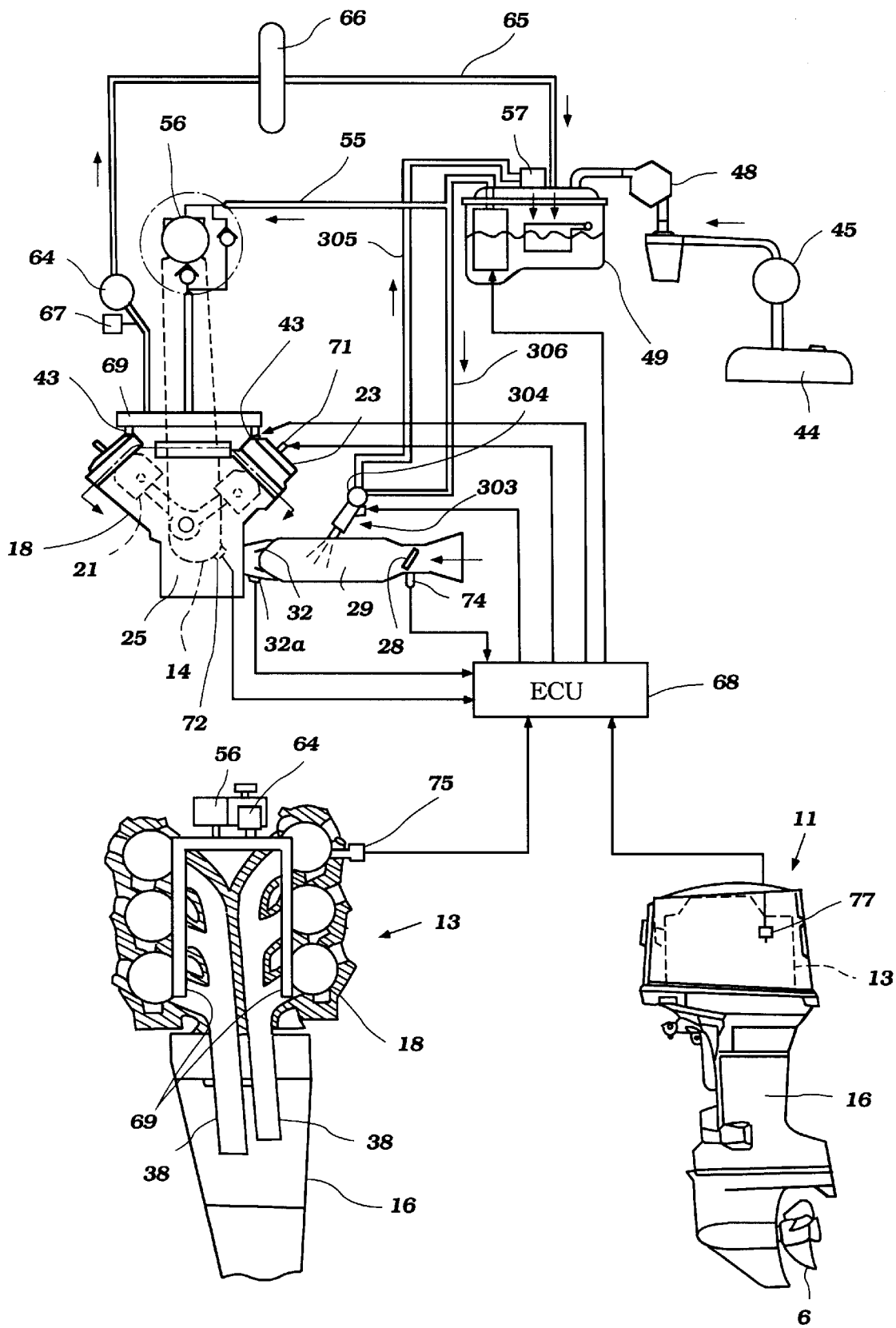
FIG. 19 is a view, in part also similar to FIG. 1, and shows another two-cycle engine in accordance with another embodiment of the invention.
Figure 20:
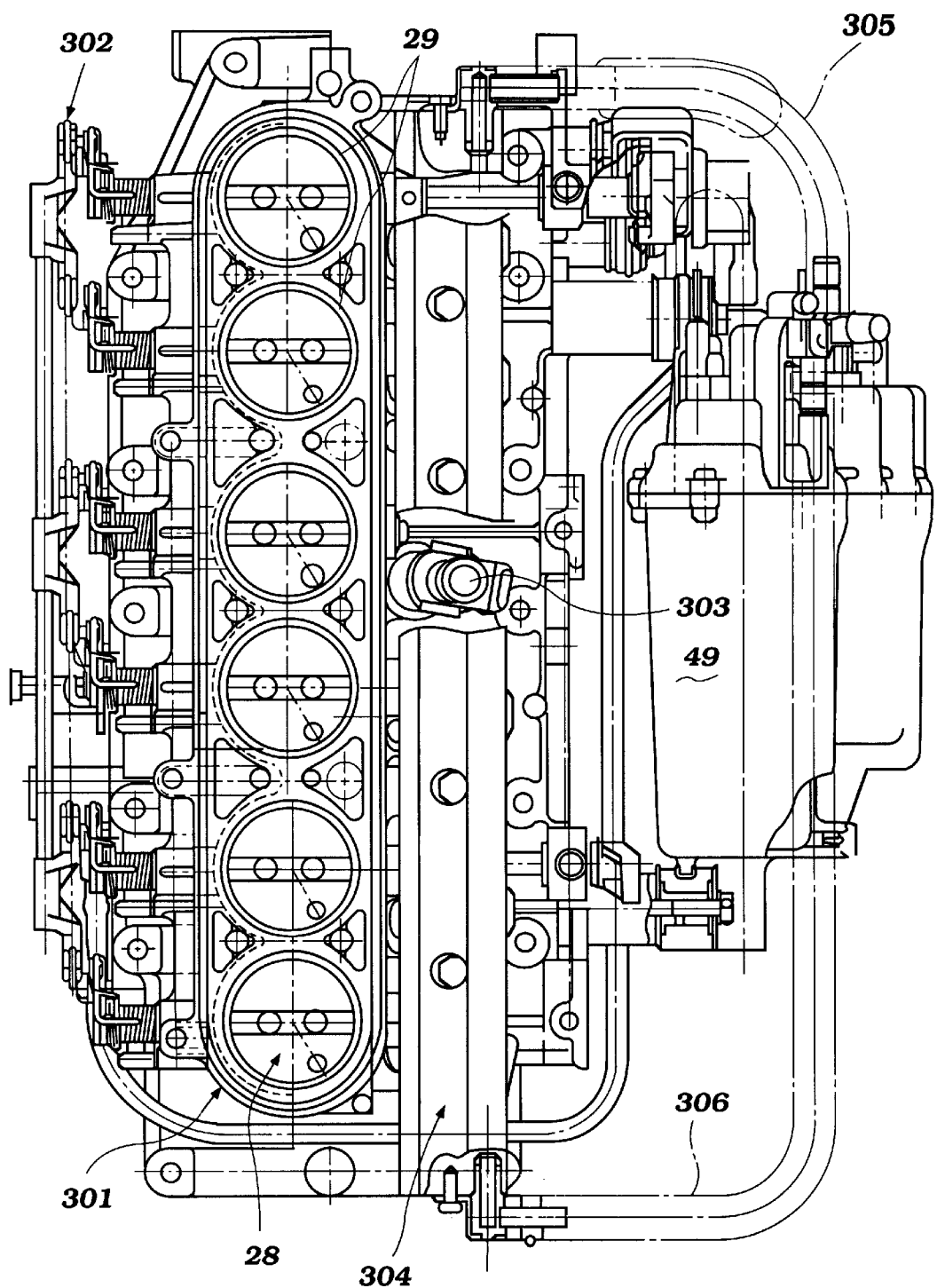
FIG. 20 is a view showing another aspect of the engine in FIG. 19 and particularly a front part of an intake manifold.

Referring now to FIG. 19 and FIG. 20, another embodiment will be described hereunder. Since most part of FIG. 19 shows the same devices and components disclosed in FIG. 1, no further description on them is made by giving the same reference numerals thereto in FIG. 19 and also FIG. 20. An intake manifold 301 is provided and the manifold 301 has six intake runners 29. The intake runners accommodate throttle valves 28 therein that are operated with a control mechanism 302. The intake runners 29 have also an auxiliary injector 303 individually. An auxiliary fuel rail 304 is disposed vertically along the intake runners 29 and connects the auxiliary injectors 303. The top end of the fuel rail 304 is connected to the pressure line 55 through a supply line 305 and the bottom end of the rails 304 is connected to the low pressure regulator 57 through a return line 306.

The auxiliary fuel injectors 303 spray fuel into the intake runners 29. Because of this, the main fuel injectors 43 are merely required to inject fuel that allows the high pressure pump 56 to keep sufficient pressure. In other words, the auxiliary injectors 303 can compensate for insufficiency so that the load for the main injectors 43 is reduced. Thus, the fuel pressure has stability at every moment. Also, the fuel injected to the intake runners 29 goes into the combustion chamber with fresh air through the crank chamber and hence have sufficient time for diffusing. This ensures smooth starting further.

It should be noted that the second embodiment is also applicable to a four cycle engine.

The embodiments thus far described are all in connection with an outboard motor. However, the invention also can be utilized with various engines such as another marine engine and a land vehicle engine including a lawn mower engine.

Thus, from the foregoing description it should be readily apparent that the start up control is very effective in providing good engine starting and thus resolving the problems described. Of course, the foregoing description is that of preferred embodiments of the invention, and various changes and modifications may be made without departing from the spirit and scope of the invention, as defined by the appended claims.

What is claimed is:

1. A direct cylinder injected, internal combustion engine for a marine propulsion device comprising an engine body defining a plurality of cylinder bores in which pistons reciprocate, a cylinder head affixed to one end of said engine body for closing said cylinder bores and defining with said pistons and said cylinder bores a plurality of combustion chambers, fuel injectors for spraying fuel directly into said combustion chambers, a fuel pump for supplying the fuel to said fuel injectors, means for sensing a pressure of the fuel supplied by said fuel pump, a control system controlling initiation time of fuel spray by said fuel injectors, the control system advancing the initiation time based upon an output from said fuel pressure sensing means when the pressure of the fuel is below a predetermined value, said control system retarding the initiation time, which has been initially advanced, step by step every reciprocation of said pistons until the pressure of the fuel reaches the predetermined value, and an exhaust system for discharging burnt combustion products to a body of water from said combustion chambers, the exhaust system including a plurality of exhaust passages connected to said combustion chambers and having different lengths from each other, said control system being configured to retard the initiation time for one of said combustion chambers, which is connected to one of the exhaust passages shorter than other one of the exhaust passages, more than the initiation time for other one of said combustion chambers that is connected to said other one of the exhaust passages.

2. A direct cylinder injected, internal combustion engine as set forth in claim 1, wherein said control system advances the initiation time in a start up operation.

3. A direct cylinder injected, internal combustion engine as set forth in claim 1, wherein said fuel pressure sensing means includes a fuel pressure sensor.

4. A direct cylinder injected, internal combustion engine as set forth in claim 1, wherein said control system further controls duration of the fuel spray by said fuel injectors, said control system elongates the duration based upon the output from said fuel pressure sensing means when the pressure of the fuel is below the predetermined value, and said control system shortens the duration, which has been initially elongated, step by step every reciprocation of said pistons until the pressure of the fuel reaches the predetermined value.

5. A direct cylinder injected, internal combustion engine as set forth in claim 1 further comprising an air induction system arranged to supply air charges to said combustion chambers, and an auxiliary fuel injector arranged to spray fuel to said air induction system.

6. A direct cylinder injected, internal combustion engine as set forth in claim 1, wherein said engine operates on a two cycle crankcase compression principle.

7. A direct cylinder injected, internal combustion engine as set forth in claim 1, wherein said engine operates on a four cycle combustion principle.

8. A direct cylinder injected, internal combustion engine as set forth in claim 1, wherein said combustion chambers are spaced apart generally vertically from each other, and one of the combustion chambers disposed below another one of the combustion chambers is connected to said one of the exhaust passages that is shorter than said other one of the exhaust passages.

9. A direct cylinder injected, internal combustion engine as set forth in claim 1, wherein the control system further controls duration of the fuel spray by the fuel injectors, said control system being configured to elongate the duration based upon the output from said fuel pressure sensing means when the pressure of the fuel is below the predetermined value, and said control system further configured to shorten the duration for one of said combustion chambers, which is connected to one of the exhaust passages shorter than other one of the exhaust passages, more than the duration for other one of said combustion chambers that is connected to said other one of the exhaust passages.

10. A method of operating a direct cylinder injected, internal combustion engine for a marine propulsion device including a plurality of combustion chambers, fuel injectors, a fuel pump, a sensor, and an exhaust system for discharging burnt combustion products to a body of water from said combustion chambers, the exhaust system including a plurality of exhaust passages connected to said combustion chambers and having different lengths from each other, said method comprising controlling initiation time of fuel spray made directly into the combustion chambers by said fuel injectors, sensing a pressure of the fuel supplied by said fuel pump with said sensor, determining with an output from the sensor whether the pressure of the fuel is below a preset value, advancing the initiation time when the pressure of the fuel is below the preset value, retarding the initiation time, which has been initially advanced, step by step for each combustion in the combustion chambers until the pressure of the fuel reaches the predetermined value, and retarding the initiation time for one of said combustion chambers, which is connected to one of the exhaust passages shorter than other one of the exhaust passages, more than the initiation time for other one of said combustion chambers that is connected to said other one of the exhaust passages.

11. A method of operating a direct cylinder injected, internal combustion engine as set forth in claim 10, wherein the initiation time is advanced in a start up operation.

12. A method of operating a direct cylinder injected, internal combustion engine as set forth in claim 10 further comprising controlling duration of the fuel spray, elongating the duration when the pressure of the fuel is below the preset value, and shortening the duration, which has been initially elongated, step by step for each combustion in the combustion chambers until the pressure of the fuel reaches the predetermined value.

13. A method of operating a direct cylinder injected, internal combustion engine as set forth in claim 10, wherein said engine operates on a two cycle crankcase compression principle.

14. A method of operating a direct cylinder injected, internal combustion engine as set forth in claim 10, wherein said engine operates on a four cycle combustion principle.

15. A method of operating a direct cylinder injected, internal combustion engine as set forth in claim 10, wherein said combustion chambers are spaced generally vertically from each other, one of the combustion chambers disposed below another one of the combustion chambers is connected to said one of the exhaust passages that is shorter than said other one of the exhaust passages.

16. A method of operating a direct cylinder injected, internal combustion engine as set forth in claim 10 additionally comprising controlling a duration of fuel spray, elongating the duration when the pressure of the fuel is below the preset value, and shortening the duration for one of said combustion chambers, which is connected to a relatively shorter of the exhaust passages, relatives duration for at least one other of said combustion chambers.

17. A direct cylinder injected, internal combustion engine for a marine propulsion device comprising an engine body defining a plurality of cylinder bores in which pistons reciprocate, a cylinder head affixed to one end of said engine body for closing said cylinder bores and defining, along with said pistons and said cylinder bores, a plurality of combustion chambers, fuel injectors for spraying fuel directly into said combustion chambers, a fuel pump for supplying fuel to said fuel injectors, means for sensing a pressure of the fuel supplied by said fuel pump, a control system controlling a duration of fuel spray by said fuel injectors, the control system elongating the duration based upon an output from said fuel pressure sensing means when the pressure of the fuel is below a predetermined value, said control system shortening the duration, which has been initially elongated, step by step every reciprocation of said pistons until the pressure of the fuel reaches the predetermined value, and an exhaust system for discharging burnt combustion products to a body of water from said combustion chambers, the exhaust system including a plurality of exhaust passages connected to said combustion chambers and having different lengths from each other, said control system being configured to shorten the duration for one of said combustion chambers, which is connected to a relatively shorter of the exhaust passages, relative to the duration for at least one other of the combustion chambers.

18. A method of operating a direct cylinder injected, internal combustion engine for a marine propulsion device including a plurality of combustion chambers, a plurality of fuel injectors, a fuel pump, a sensor, and an exhaust system for discharging burnt combustion products to a body of water from said combustion chambers, the exhaust system including a plurality of exhaust passages connected to said combustion chambers and having different lengths from each other, said method comprising controlling a duration of fuel spray made directly into the combustion chambers by the fuel injectors, sensing a pressure of the fuel supplied by said fuel pump with said sensor, determining with an output from the sensor whether the pressure of the fuel is below a preset value, elongating the duration when the pressure of the fuel is below the preset value, shortening the duration, which has been initially elongated, step by step for every combustion cycle in the combustion chambers until the pressure of the fuel reaches the predetermined value, and shortening the duration for one of said combustion chambers, which is connected to one of the exhaust passages shorter than other one of the exhaust passages, relative to the duration for at least one other of said combustion chambers.

* * * * *